United States Patent [19]
Cruikshank et al.
[11] 4,370,412
[45] Jan. 25, 1983

[54] AQUEOUS HYDROPHILIC COLLOID COATING COMPOSITION CONTAINING A COMBINATION OF ANIONIC SURFACTANTS

[75] Inventors: Susan J. Cruikshank; Michael W. Orem, both of Rochester, N.Y.

[73] Assignee: Eastman Kodak Company, Rochester, N.Y.

[21] Appl. No.: 942,201

[22] Filed: Sep. 14, 1978

[51] Int. Cl.$^3$ .......................... G03C 1/76; G03C 1/38; C08K 89/00

[52] U.S. Cl. .................................... 430/635; 106/135; 252/354; 430/518; 430/529; 430/539; 430/642

[58] Field of Search ........................ 252/354; 106/135; 96/67, 94 R, 114.7; 430/539, 642, 635

[56] References Cited

U.S. PATENT DOCUMENTS

| | | | |
|---|---|---|---|
| 2,527,260 | 10/1950 | Hart et al. | 96/114.5 |
| 2,534,050 | 12/1950 | Murray | 96/114.5 |
| 3,222,191 | 12/1965 | Steiner et al. | 426/106 |
| 3,241,970 | 3/1966 | Popeck | 96/94 R |

FOREIGN PATENT DOCUMENTS

| | | | |
|---|---|---|---|
| 661533 | 11/1951 | United Kingdom | 8/44 |
| 1358885 | 7/1974 | United Kingdom | 96/114.6 |
| 1417915 | 12/1975 | United Kingdom | 96/114.5 |
| 1439402 | 6/1976 | United Kingdom | 96/114.5 |

*Primary Examiner*—Richard D. Lovering
*Attorney, Agent, or Firm*—Alfred P. Lorenzo

[57] ABSTRACT

A combination of two anionic surfactants, one of which is an alkyl sulfate surfactant, such as sodium dodecyl sulfate, and the other of which is an N-acyl sarcosinate surfactant, such as sodium lauroyl sarcosinate, is used as a coating aid in aqueous coating compositions comprising a hydrophilic colloid. The combination of surfactants provides a coating composition which combines the advantage of good wetting or spreading characteristics with the advantage of excellent ability to avoid repellency defects. Such coating compositions are especially useful in the coating of gelatin silver halide emulsion layers or other hydrophilic colloid layers in photographic materials.

2 Claims, No Drawings

AQUEOUS HYDROPHILIC COLLOID COATING COMPOSITION CONTAINING A COMBINATION OF ANIONIC SURFACTANTS

BACKGROUND OF THE INVENTION

1. Field of the Invention

This invention relates to hydrophilic colloid layers, to photographic elements containing such layers, and to aqueous hydrophilic colloid coating compositions from which such layers are prepared, all of which are characterized by the presence of certain coating aids. More specifically, this invention relates to an aqueous hydrophilic colloid coating composition containing, as a coating aid, a combination of two anionic surfactants.

2. Description of the Prior Art

In the coating of aqueous hydrophilic colloid coating compositions such as, for example, in the coating of gelatin silver halide emulsions or other hydrophilic colloid compositions in the manufacture of photographic materials, it is well known to utilize a surfactant as a coating aid and a wide variety of different surfactants have been proposed heretofore for this purpose. The presence of the surfactant serves to improve the quality and uniformity of the coated layers and the ease and reproducibility of their application. Moreover, it often influences other characteristics than the ease of coating, such as for example, surface roughness, permeability to processing solutions, and the like. The requirements for an effective coating aid are difficult to meet, particularly when it is desired to utilize high coating speeds, to apply liquid coating compositions over set but undried layers, and to carry out simultaneous coating of a plurality of layers. They are especially difficult to meet in the photographic art where it is also necessary that the coating aid be free from adverse photographic effects.

An important class of surfactants utilized as coating aids in aqueous hydrophilic colloid coating compositions employed in the manufacture of photographic products are the alkyl sulfate surfactants. This use of alkyl sulfate surfactants is described, for example, in U.S. Pat. No. 2,527,260 and in British Pat. Nos. 1,417,915 and 1,439,402. They are particularly advantageous as coating aids in aqueous hydrophilic colloid coating compositions because of their ability to promote the formation of coated layers which exhibit few or no repellency defects, that is, spot-like marks within a coated layer caused by insoluble oily contaminants. However, they suffer from this disadvantage that they provide relatively poor wetting characteristics such that a coated layer will not spread uniformly over a simultaneously coated underlayer, especially when the underlayer contains a high level of surfactant. This inability to spread uniformly is manifested by edge withdrawal.

It is toward the objective of providing a coating aid for aqueous hydrophilic colloid coating compositions which combines the advantage of good wetting or spreading characteristics with excellent ability to avoid repellency defects that the present invention is directed.

SUMMARY OF THE INVENTION

It has now been discovered that the poor wetting or spreading characteristics typical of aqueous hydrophilic colloid coating compositions containing an alkyl sulfate surfactant can be substantially overcome, while retaining the excellent performance in regard to repellency defects which characterizes such compositions, by using in combination with the alkyl sulfate surfactant an N-acyl sarcosinate surfactant. Thus, the present invention provides aqueous coating compositions containing a hydrophilic colloid and, as a coating aid, an effective amount of both an alkyl sulfate surfactant and an N-acyl sarcosinate surfactant.

Aqueous coating compositions containing a hydrophilic colloid and an N-acyl sarcosinate surfactant are known to the prior art. They are described, for example, in British Pat. No. 1,358,885. However, the use of a combination of an alkyl sulfate surfactant and an N-acyl sarcosinate surfactant as a coating aid in the coating of aqueous compositions containing a hydrophilic colloid is novel and provides unexpected beneficial results. In particular, aqueous hydrophilic colloid coating compositions which contain only an alkyl sulfate surfactant provide poor wetting characteristics, as described hereinabove, while aqueous hydrophilic colloid coating compositions containing only an N-acyl sarcosinate surfactant provide coated layers in which repellency defects occur to an unacceptable extent. It has been unexpectedly found, in accordance with this invention, that use of a combination of an alkyl sulfate surfactant and an N-acyl sarcosinate surfactant in an aqueous hydrophilic colloid composition provides a coating composition that is greatly superior to one containing only an alkyl sulfate surfactant in regard to uniform spreading and is greatly superior to one containing only an N-acyl sarcosinate surfactant in regard to avoiding the formation of repellency defects. Thus, the two classes of surfactants, both of which are anionic surfactants, function effectively in combination to provide a coating composition capable of meeting the exacting requirements for use in the manufacture of photographic materials.

DESCRIPTION OF THE PREFERRED EMBODIMENTS

The present invention is especially useful in the manufacture of photographic materials and particularly in the utilization of simultaneous multilayer coating methods in coating aqueous hydrophilic colloid compositions employed in the manufacture of photographic materials. Accordingly, it is specifically described hereinafter with respect to the manufacture of such photographic materials. However, the invention is broadly useful wherever an aqueous coating composition comprising a hydrophilic colloid requires a coating aid to promote the coating of high quality layers and, accordingly, it can be applied in the manufacture of a wide variety of coated materials.

In accordance with this invention, a combination of two anionic surfactants one of which is an alkyl sulfate surfactant and the other of which is an N-acyl sarcosinate surfactant is incorporated in an aqueous coating composition comprising a hydrophilic colloid. The alkyl sulfate surfactant is used in an amount sufficient to avoid, or at least substantially avoid, repellency defects while the N-acyl sarcosinate surfactant is used in an amount sufficient to provide good wetting or spreading characteristics.

Preferably, the alkyl sulfate surfactant employed in this invention is a compound of the formula:

$$R—CH_2—O—SO_3M$$

wherein M is ammonium or an alkali metal and R is an alkyl group of 6 to 20 carbon atoms. Particularly preferred alkyl sulfate surfactants are compounds of the above formula in which R is an alkyl group of 9 to 15 carbon atoms. Examples of the alkyl sulfate surfactants include:

sodium decyl sulfate
sodium dodecyl sulfate
potassium tridecyl sulfate
ammonium tetradecyl sulfate
ammonium pentadecyl sulfate
sodium hexadecyl sulfate
and the like.

Preferably, the N-acyl sarcosinate surfactant employed in this invention is a compound of the formula:

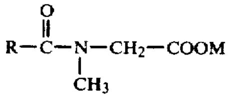

wherein M is ammonium or an alkali metal and R is an alkyl group of 6 to 20 carbon atoms. Particularly preferred N-acyl sarcosinate surfactants are compounds of the above formula in which R is an alkyl group of 9 to 15 carbon atoms. Examples of the N-acyl sarcosinate surfactants include:

sodium lauroyl sarcosinate
potassium lauroyl sarcosinate
potassium myristoyl sarcosinate
ammonium palmitoyl sarcosinate
sodium margaroyl sarcosinate
sodium stearoyl sarcosinate
and the like.

In practicing the present invention, more than one surfactant from the class of alkyl sulfate surfactants and more than one surfactant from the class of N-acyl sarcosinate surfactants can be included in the coating composition, if desired. Other surfactants of either anionic, cationic or non-ionic types, or mixtures thereof, can also be included where it is advantageous to do so.

The combination of anionic surfactants described herein is effective as a coating aid in any aqueous coating composition comprising a hydrophilic colloid. A preferred hydrophilic colloid is gelatin or a gelatin derivative, including acid-treated gelatin such as pigskin gelatin and alkali-treated gelatin such as bone gelatin, but it may be some other colloidal material such as colloidal albumin, a cellulose derivative, or a synthetic resin, for instance, a polyvinyl compound. Some colloids which may be used are polyvinyl alcohol or a hydrolyzed polyvinyl acetate as described in U.S. Pat. No. 2,286,215; a far hydrolyzed cellulose ester such as cellulose acetate hydrolyzed to an acetyl content of 19–26% as described in U.S. Pat. No. 2,327,808; a water-soluble ethanolamine cellulose acetate as described in U.S. Pat. No. 2,322,085; a polyacrylamide or an imidized polyacrylamide as described in U.S. Pat. No. 2,563,791; a vinyl alcohol polymer containing urethane carboxylic acid groups of the type described in U.S. Pat. No. 2,768,154; or containing cyano-acetyl groups such as the vinyl alcohol-vinyl cyanoacetate copolymer described in U.S. Pat. No. 2,808,331; or a polymeric material which results from polymerizing a protein or a saturated acylated protein with a monomer having a vinyl group as described in U.S. Pat. No. 2,852,382; or certain acrylate copolymers may be used such as the copolymers described in U.S. Pat. No. 3,062,674.

In the aqueous hydrophilic colloid coating compositions of this invention, the alkyl sulfate surfactant is typically employed in an amount of from about 0.1 to about 3 parts per part by weight of the N-acyl sarcosinate surfactant, and preferably in an amount of from about 0.3 to about 2 parts per part by weight. The combined concentration of the alkyl sulfate surfactant and the N-acyl sarcosinate surfactant can be any amount effective to act as a coating aid. Optimum amounts will depend upon such factors as the particular hydrophilic colloid employed, the concentration of hydrophilic colloid in the coating composition, the presence or absence of other ingredients which affect the coating characteristics of the composition, and the method of coating employed. Typically, the combined amount of alkyl sulfate surfactant and N-acyl sarcosinate surfactant will be in the range from about 0.3 to about 5 parts per 100 parts by weight of hydrophilic colloid, with preferred amounts being in the range from about 0.5 to about 3 parts per 100 parts by weight. An optimum ratio to achieve both effective control of repellency defects and good wetting and spreading characteristics at a minimum total surfactant concentration is one part of alkyl sulfate surfactant to three parts by weight of N-acyl sarcosinate surfactant.

The surfactant combination of this invention can be used to coat hydrophilic colloids on a wide variety of supports. The hydrophilic colloid layers can be coated on one or both sides of the support, as desired. Typical supports are cellulose nitrate film, cellulose ester film, polyvinyl acetal film, polystyrene film, polyethylene terephthalate film, and related films or resinous materials, as well as glass, paper, metal and the like. Supports such as paper, which are coated with alpha-olefin polymers, particularly polymers of alpha-olefins containing two or more carbon atoms, as exemplified by polyethylene, polypropylene, ethylene-butene copolymers and the like, can also be employed.

The surfactant combination employed in the practice of this invention can be used in various kinds of silver halide photographic emulsions. In addition to being useful in orthochromatic, panchromatic and infrared-sensitive emulsions, it is also useful in X-ray and other non-optically sensitized emulsions. It can be used in sulfur and gold sensitized silver halide emulsions. Emulsions containing various types of silver salts can be used such as silver bromide, silver iodide, silver chloride or mixed silver halides such as silver chlorobromide, silver bromoiodide or silver chloroiodide. Conventional addenda such as, for example, hardening agents, anifoggants, stabilizers, plasticizers, developing agents, and the like, can be included in the emulsions. The surfactant combination employed in the practice of this invention can be used to coat hydrophilic colloid layers in elements intended for color photography, for example, silver halide emulsions containing color-forming couplers or emulsions to be developed in solutions containing couplers or other color-generating materials.

The utility of the surfactant combination described herein is not limited to coatings and coating procedures involving radiation-sensitive gelatin silver halide emulsions. Such combination can also be used, for example, in coating hydrophilic colloid layers containing reflective pigments, antihalation dyes, filter dyes, mordants, and the like; in coating antistatic layers; in coating receiving layers for diffusion transfer, in coating subbing layers which impart improved adhesion; and in coating overcoat layers which provide improved resistance to abrasion. It is particularly advantageous in simultaneously coating interlayers of photographic elements with other layers because of its ability to promote uniform spreading of the simultaneously coated layers.

A typical example of such use is in coating gelatin interlayers containing hydroquinone derivatives which function as scavengers for oxidized developers. The use of such scavengers is described, for example, in U.S. Pat. Nos. 2,701,197, 2,728,659, and 3,700,453.

The aqueous hydrophilic colloid coating compositions described herein are especially useful in bead coating processes and curtain coating processes used in the manufacture of photographic elements. Such processes can be used in carrying out single layer or simultaneous multi-layer coating operations. They are well known procedures and have been described in numerous patents such as, for example, U.S. Pat. Nos. 2,681,294, 2,761,791, 3,508,947, and 3,632,374.

The invention is further illustrated by the following examples of its practice.

EXAMPLE 1

Using a multi-slide hopper of the type described in U.S. Pat. No. 2,761,791, a two-layer simultaneous coating process was carried out in which a 175 micron thick poly(ethylene terephthalate) support was coated at a speed of 25 centimeters per second. The lower layer was formed from an aqueous solution having a viscosity of 5 centipoises comprising 5% by weight of bone gelatin, dispersed carbon particles in an amount of 0.075 parts per part by weight of gelatin, and oleic acid in an amount of 0.033 parts per part by weight of gelatin, coated in an amount of 65 cubic centimeters of coating composition per square meter of support surface. The upper layer was formed from an aqueous solution having a viscosity of 18 centipoises, comprising 10% by weight of bone gelatin and a coating aid as described below, coated in an amount of 12 cubic centimeters of coating composition per square meter of support surface. Coatings were made at five different levels of coating aid and, in each instance, the resulting product was examined for repellency defects. The products were then rated for the level of repellency defects observed in accordance with the following scale:

| Rating | Number of Defects in an Area of 200 Square Centimeters |
|---|---|
| High (H) | Greater than 20 |
| Low (L) | 1-20 |
| None (N) | 0 |

Results obtained are reported in Table I below.

TABLE I

| Coating Aid | Amount of Coating Aid (gms/100 gms gelatin) | Level of Repellency Defects |
|---|---|---|
| Sodium dodecyl sulfate | 0.11 | H |
| | 0.22 | L |
| | 0.44 | N |
| | 0.88 | N |
| | 1.32 | N |
| Sodium lauroyl sarcosinate | 0.11 | H |
| | 0.22 | H |
| | 0.44 | H |

TABLE I-continued

| Coating Aid | Amount of Coating Aid (gms/100 gms gelatin) | Level of Repellency Defects |
|---|---|---|
| | 0.88 | H |
| | 1.32 | H |
| Sodium dodecyl sulfate | 0.11 | H |
| + | 0.22 | L |
| Sodium lauroyl sarcosinate | 0.44 | N |
| (2:1 by weight) | 0.88 | N |
| | 1.32 | N |
| Sodium dodecyl sulfate | 0.11 | H |
| + | 0.22 | L |
| Sodium lauroyl sarcosinate | 0.44 | N |
| (1:1 by weight) | 0.88 | N |
| | 1.32 | N |
| Sodium dodecyl sulfate | 0.11 | H |
| + | 0.22 | L |
| Sodium lauroyl sarcosinate | 0.44 | N |
| (1:3 by weight) | 0.88 | N |
| | 1.32 | N |

As indicated by the above results, sodium lauroyl sarcosinate does not effectively control repellencies at any of the concentrations utilized, whereas the combination of sodium dodecyl sulfate and sodium lauroyl sarcosinate is capable of providing very effective control.

EXAMPLE 2

The poly(ethylene terephthalate) support utilized in Example 1 was coated in the same manner described in Example 1 and at the same speed with a two-layer coating. The lower layer was formed from an aqueous solution having a viscosity of 5.5 centipoises comprising 5% by weight of bone gelatin, dispersed carbon particles in an amount of 0.075 parts per part by weight of gelatin, and 0.022 parts per part by weight of gelatin of a surfactant, coated in an amount of 65 cubic centimeters of coating composition per square meter of support surface. The surfactant incorporated in the coating composition was a sodium salt of an alkyl naphthalene sulfonate. The upper layer was formed from an aqueous solution having a viscosity of 18 centipoises, comprising 10% by weight of bone gelatin and a coating aid as described below, coated in an amount of 12 cubic centimeters of coating composition per square meter of support surface. Coatings were made at five different levels of coating aid and in each instance the resulting product was examined to determine the extent to which the upper layer was able to spread properly over the lower layer. Inability of the upper layer to spread properly is evidenced by edge withdrawal and the results are reported as severe edge withdrawal, moderate edge withdrawal, slight edge withdrawal, or no edge withdrawal. Results obtained are reported in Table II below.

TABLE II

| Coating Aid | Amount of Coating Aid (gms/100 gms gelatin) | Degree of Edge Withdrawal |
|---|---|---|
| Sodium dodecyl sulfate | 0.11 | Severe |
| | 0.22 | Severe |
| | 0.44 | Severe |
| | 0.88 | Severe |
| | 1.32 | Severe |
| Sodium lauroyl sarcosinate | 0.11 | Severe |
| | 0.22 | Severe |
| | 0.44 | None |
| | 0.88 | None |
| | 1.32 | None |

TABLE II-continued

| Coating Aid | Amount of Coating Aid (gms/100 gms gelatin) | Degree of Edge Withdrawal |
|---|---|---|
| Sodium dodecyl sulfate | 0.22 | Severe |
| + | 0.44 | Moderate |
| Sodium lauroyl sarcosinate | 0.66 | Moderate |
| (2:1 by weight) | 0.88 | Slight |
| | 1.32 | None |
| Sodium dodecyl sulfate | 0.22 | Severe |
| + | 0.44 | Moderate |
| Sodium lauroyl sarcosinate | 0.66 | None |
| (1:1 by weight) | 0.88 | None |
| | 1.32 | None |
| Sodium dodecyl sulfate | 0.22 | Severe |
| + | 0.44 | Slight |
| Sodium lauroyl sarcosinate | 0.66 | None |
| (1:3 by weight) | 0.88 | None |
| | 1.32 | None |

As indicated by the above results, the use of sodium dodecyl sulfate alone results in severe edge withdrawal at all of the concentrations utilized, whereas the combination of sodium dodecyl sulfate and sodium lauroyl sarcosinate is capable of providing excellent spreading which results in no edge withdrawal.

The invention has been described in detail with particular reference to preferred embodiments thereof, but it will be understood that variations and modifications can be effected within the spirit and scope of the invention.

We claim:

1. An aqueous coating composition comprising gelatin, sodium dodecyl sulfate and sodium lauroyl sarcosinate, said composition containing from about 0.3 to about 2 parts of said sodium dodecyl sulfate per part by weight of said sodium lauroyl sarcosinate, the combined weight of said sodium dodecyl sulfate and said sodium lauroyl sarcosinate being in the range of from about 0.5 to about 3 parts per 100 parts by weight of gelatin.

2. A photographic element comprising a support and at least one layer containing gelatin, sodium dodecyl sulfate and sodium lauroyl sarcosinate, the combined weight of said sodium dodecyl sulfate and said sodium lauroyl sarcosinate being in the range of from about 0.5 to about 3 parts per 100 parts by weight of gelatin, and said sodium dodecyl sulfate being present in an amount of from about 0.3 to about 2 parts per part by weight of said sodium lauroyl sarcosinate.

* * * * *